Figure 1:
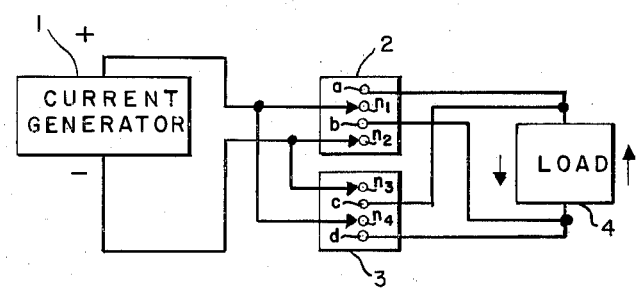

Nov. 2, 1965

O. H. FLATTEN 3,216,000

INCREMENTAL RATE CONVERTER

Filed May 27, 1959

2 Sheets-Sheet 1

INVENTOR.
ORRIS H. FLATTEN

BY *John A. Duffy*

AGENT

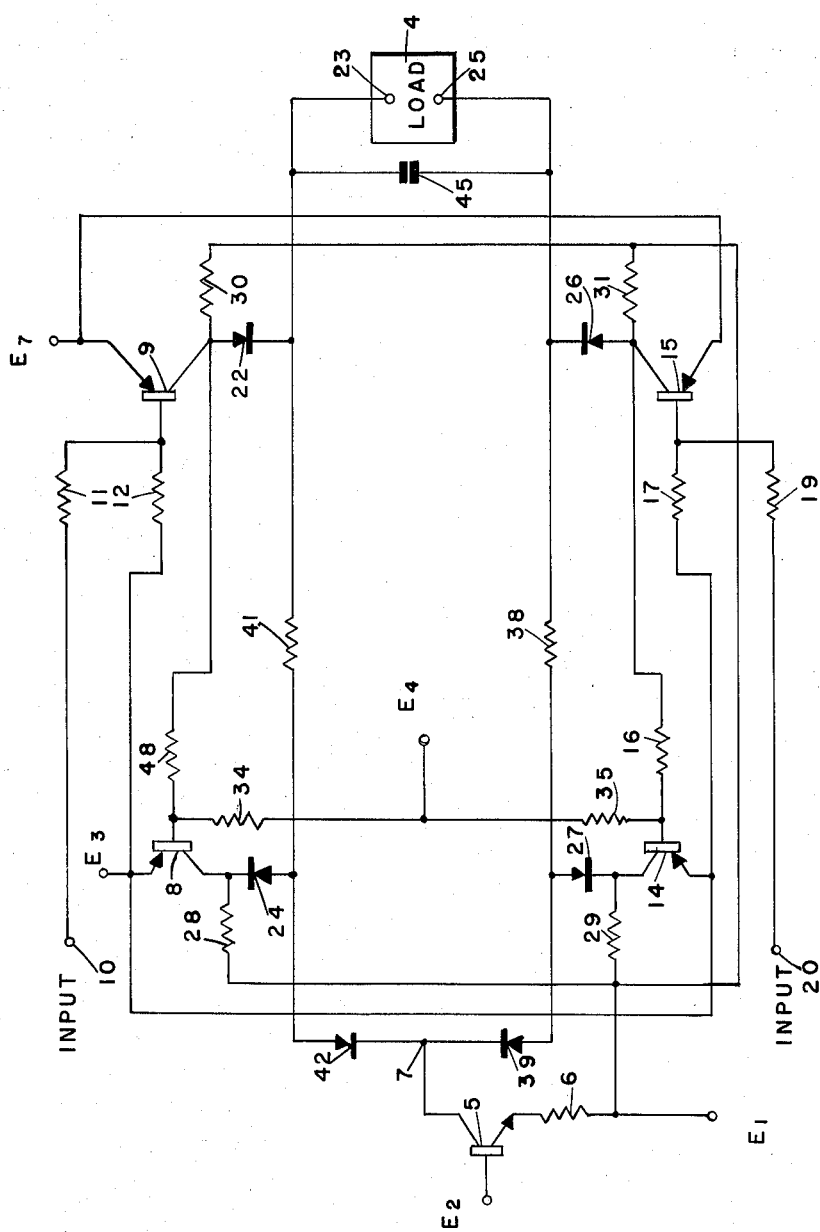

United States Patent Office 3,216,000
Patented Nov. 2, 1965

3,216,000
INCREMENTAL RATE CONVERTER
Orris H. Flatten, Fullerton, Calif., assignor to
North American Aviation, Inc.
Filed May 27, 1959, Ser. No. 816,184
13 Claims. (Cl. 340—347)

This invention relates to frequency responsive devices and more particularly to a device for producing a direct-current analog signal indicative of the alegbraic sum of the rates of a pair of electrical pulse signals.

In many instances in computer systems there is obtained information which is in the nature of varying or incremental rate voltage signals at the output of a digital computer. These signals may be in the form of constant amplitude pulse signals whose rate is directly proportional to the information being received from the computer. In order to utilize this information it is necessary to convert the incremental type of pulse signals to a direct-current analog type signal which is proportional to the algebraic sum of the incremental rates of the input signals.

Devices of the prior art used to convert incremental rate signals received from a digital computer into a direct-current signal utilized circuitry such as D.-C. amplifiers having inherent drift errors limiting diodes and summing networks having inherent errors caused from leakage currents. Accordingly, the summed output of these converters did not meet the required accuracy.

Conversion of a pair of rate incremental pulse signals received from a digital computer to a D.-C. current which is the algebraic sum of the pulse rates is achieved by the device of the present invention in a highly accurate and relatively simple manner. High accuracy is obtained by utilizing transistors and low leakage silicon diodes taking advantage of the constant current properties of the transistors and inherent low leakage of the silicon diodes. A pair of transistorized switches are provided which alternatively switch a constant current source from one side to the other of an output load. The algebraic sum of the input signals is received by measuring the current through the load. The transistorized switches include unidirectional silicon diodes associated therewith to provide an accurate circuit with substantially no leakage current. Thus the average current flowing in the output load is a highly accurate measurement of the algebraic sum of the incremental rate of the input pulse signals.

It is therefore an object of this invention to provide an improved circuit for converting incremental signals to analog signals.

It is another object of this invention to provide a circuit for converting incremental rate pulse signals to analog signals.

It is still another object of this invention to provide a converter for computing the algebraic sum of the pulse rates of a pair of incremental pulse signals.

It is still another object of this invention to provide a transistorized incremental rate converter.

It is a further object of this invention to provide a position error converter for converting a pair of rate incremental pulse signals indicative of position error to an analog signal indicative of the algebraic sum of the rates of the incremental pulse signals.

Other objects of invention will become apparent from the following description taken in connection with the accompanying drawings, in which—

FIG. 1 illustrates the invention in simplified block form; and

Figure 2:
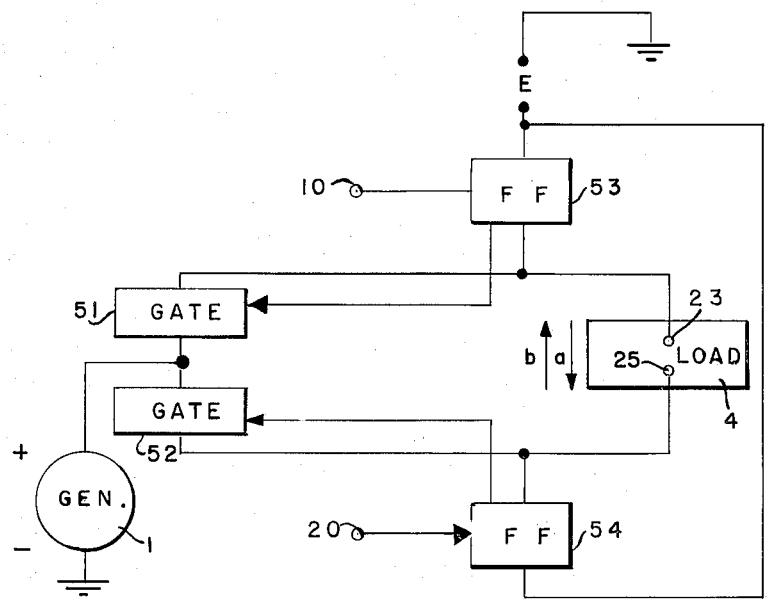

FIG. 2 further illustrates the principles of the invention in block form; and

FIG. 3 is a schematic diagram of the preferred embodiment of the converter of this invention.

Referring to FIG. 1, a simplified block diagram is shown illustrating the principles of the device of this invention. In FIG. 1 constant current generator 1 is connected through a pair of transistorized switches 2 and 3 across a load or measuring means 4. Switch 2 may, for example, be connected to be responsive to one pulse train input from a digital computer indicative of a position error in one direction. Switch 3 may, for example, be connected to be responsive to a pulse train input from a digital computer indicative of a position error in the other direction. Switch 2, when receiving pulse inputs from a digital computer, for example, is connected to switch from the neutral position $n_1$ and $n_2$ to positions $a$ and $b$. When in the positions $a$ and $b$ constant current generator 1 is connected to supply current across load 4. With the polarities shown a positive current flows in a downward direction through load 4. When switch 3 is receiving a pulse train input from a digital computer the switch position is switched from neutral positions $n_3$ and $n_4$ to terminals $c$ and $d$, thereby providing current flow from current generator 1 through load 4 in a direction opposite to the current flow when switch 2 is actuated. Load 4 may comprise, for example, suitable indicating means for measuring the average current flowing through load 4. Thus the average current flowing through 4 is the algebraic sum of the amount of pulse signals received by switch 2 and the amount of pulse signals received by switch 3. In this manner the resulting current flowing through load 4 is indicative of the error from the digital computer, for example.

Referring to FIG. 2, there is further illustrated the principles of this invention in block form. Constant current generator 1 has one side (illustrated as the plus side) connected through gate 51 to one side 23 of load 4 to form a first electrical path. The plus side of current generator 1 is also connected through gate 52 to the other side 25 of load 4 to form a second electrical path. Gate 51 is controlled by the output of flip flop 53 and gate 52 is controlled by the output of flip flop 54. Flip flop 53 is connected to provide an electrical path defined by a D.-C. source E having its plus side connected to the input of flip flop 53 and its minus side connected through ground to the minus side of current generator 1. The output of flip flop 53 is connected to one side 23 of load 4. Flip flop 54 also provides an electrical path defined by the plus side of source E, the input of flip flop 54 and side 25 of the load. Flip flop 53, responsive to signals from terminal 10 applied at its control input, operates to provide a path from one side of source E, through flip flop 53, load 4, gate 52, current generator 1 and the other side of source E. Flip flop 54, responsive to signals from terminal 20, operates to provide a path from one side of source E through flip flop 54, the load, gate 51, current generator 1, and the other side of source E. Thus it may readily be seen that responsive to input signals from terminal 10 a current path is provided through load 4 in the direction shown by arrow $a$ and a current path in the reverse direction (arrow $b$) is provided responsive to signals from terminal 20.

Turning now to FIG. 3, there is shown a schematic diagram of a preferred embodiment of the circuit of this invention. In FIG. 3 constant current generator 1 of FIG. 1 is represented as transistor 5 which has its base connected to receive a constant source of D.-C. potential represented by $E_2$. Transistor 5 is, for example, of the NPN type and has its emitter connected through a suitable resistor 6 to D.-C. source $E_1$. $E_1$ is selected to be more negative than $E_2$, thus providing operating potentials on transistor 5 to maintain the transistor normally conducting. The collector of transistor 5 is connected to point 7. PNP transistors 8 and 9 form electronic switch 2 of FIG. 1, with transistor 9 receiving incremental rate type pulse signals at its base from input terminal 10 through resistor 11. Transistor 9 has its emitter connected to receive D.-C. from source $E_7$ and transistor 8 has its emitter connected to receive D.-C. from source $E_3$. The emitter of transistor 8 is connected through resistor 12 to the base of transistor 9 and the collector of transistor 9 is coupled through resistor 48 to the base of transistor 8. Transistors 8 and 9 operate as a monostable switch with transistor 8 normally conducting and transistor 9 normally cut off. Upon receipt of a negative pulse signal from input terminal 10, transistor 9 conducts and transistor 8 is cut off. The ceasing of input signals at terminal 10 causes transistor 8 to again conduct and transistor 9 to cut off. Similarly, transistors 14 and 15 of the PNP type comprise electronic switch 3 of FIG. 1. Transistor 14 has its emitter connected to receive D.-C. from source $E_3$ and transistor 15 has its emitter connected to receive D.-C. from source $E_7$. Transistors 14 and 15 are cross-coupled to form a monostable switch with the base of transistor 14 connected through resistor 16 to the collector of transistor 15 and the base of transistor 15 connected through resistor 17 to the emitter of transistor 14. Transistor 14 is normally conducting and transistor 15 is normally cut off. A negative pulse signal received from input terminal 20 through resistor 19 causes transistor 15 to conduct and cuts off transistor 14. The ceasing of input signals at terminal 20 returns transistor 14 to its normal conducting state and cuts off transistor 15. Transistor 9 is connected through diode 22 to terminal 23 of load 4. Diode 22, preferably of the silicon junction type, allows current to flow from $E_7$ through transistor 9 (when conducting as a result of input signals from terminal 10) to terminal 23 of load 4. When transistor 9 is cut off diode 22 prevents any leakage of current tending to flow in the reverse direction. Diode 24 is connected to the collector of transistor 8 and is poled in a direction to prevent the flow of current from $E_3$ through transistor 8 to load 4 when transistor 8 is turned on. Diode 24 also provides a low impedance current path through resistor 28 to $E_1$ to prevent any current from flowing through diode 42 when transistor 9 is conducting. Diode 26 connects the collector of transistor 15 to terminal 25 of load 4, with current flowing from $E_7$ through the emitter-collector of transistor 15 (when conducting as a result of an input signal from terminal 20) through diode 26 to terminal 25. Diode 26, as diode 22, is preferably of the silicon junction type to prevent any leakage current flowing when input signals are not being received from terminal 20. Diode 27 is connected to the collector of transistor 14 and is poled in a direction to prevent current flow from transistor 14 to load 4 when transistor 14 is conducting and also to provide a low impedance path away from diode 39 when transistor 15 is conducting. Resistors 28 and 29 respectively connect the cathode plates of diodes 24 and 27 to receive D.-C. from source $E_1$ to provide a negative bias potential preventing undesirable current from flowing through load 4. Similarly, resistors 30 and 31 connect the anode plates of diodes 22 and 26 respectively to D.-C. source $E_1$. Operating potentials on the base of transistors 8 and 14 are received from a D.-C. source $E_4$ connected through resistor 34 to the base of transistor 8 and through resistor 35 to the base of transistor 14. Source $E_4$ is of a more positive potential than source $E_3$, and provides a bias potential on the base of transistor 8 to maintain transistors 8 and 14 turned off when there is an input signal. Constant current generator 5 is connected to provide a current path through load 4 when transistor 9 is turned on upon receipt of a pulse signal from input terminal 10. Terminal 25 of load 4 is connected through resistor 38 and diode 39 to point 7. Diode 39 is poled in a direction to allow the flow of current from terminal 25 through the collector-emitter of transistor 5. Similarly, transistor 5 is connected to provide a current path through load 4 when transistor 15 is turned on upon receipt of a signal from input terminal 20 with terminal 23 of load 4 being connected through resistor 41 and diode 42 to point 7. Diode 42 is poled in a direction to allow the flow of current from terminal 23 through the collector-emitter circuit of transistor 5. Capacitor 45 is connected across terminals 23 and 25 of load 4 to provide a smoothing operation for the current signals received thereby.

In the circuit of FIG. 3 a quiescent condition exists when no input signals are received from terminals 10 and 20. Transistor 8 is conducting and transistors 9 is cut off in switch 2. In switch 3 transistor 14 is conducting and transistor 15 is cut off. With transistor 9 cut off, there is no current path provided between source $E_7$ and terminal 23 of load 4. Similarly, diode 24 prevents a current path from being created between source $E_3$ and terminal 23 of load 4. Transistor 15 is cut off thereby preventing the flow of current from source $E_7$ to terminal 25. Diode 27 prevents the flow of current from source $E_3$ to terminal 5. Thus there is no current path between a source and the collector of transistor 5. Transistor 5 is in a condition to be conducting since source $E_1$ is more negative than source $E_2$, but because of the fact that point 7 is not connected to receive a current flow from D.-C. sources 3 or 7, the collector of transistor 5 is floating at some quiescent potential and the base emitter circuit of transistor 5 is acting as a diode.

Input pulse signals received from terminal 10 cause transistor 9 to conduct and transistor 8 to cut off. A current path is created comprising the circuit of D.-C. source $E_7$, the emitter-collector path of transistor 9, diode 22, terminal 23 of load 4, terminal 25, resistor 38, diode 39, point 7, the collector-emitter path of conducting transistor 5, resistor 6, and source $E_1$. $E_7$ might be, for example, the B+ supply of a D.-C. source, and $E_1$ may be the B— supply of a D.-C. source, thus completing the current path. Load 4 has current flowing from terminal 23 to 25 for a predetermined time, determined by the operating conditions established at current generator 5. The pulse signals received from input terminal 10 may be of a constant amplitude, thus establishing an accurate measurement of current flow through load 4. During the time when input signals are received from terminal 10, no input signals are received from terminal 20, transistor 14 is conducting, transistor 15 is cut off, with the switch 3 being inactive in the operational function. Typical values of potential may be, for example: $E_1$——28 v.; $E_2$——14 v.; $E_7$——ground; $E_3$——+14 v.; and $E_4$——+28 v.

Now, assuming an input signal from terminal 20, transistor 15 is turned on and transistor 14 is cut off. A current path between transistor 5 and load 4 is created comprising D.-C. source $E_7$, the emitter-collector path of transistor 15, diode 26, terminal 25 to terminal 23 of load 4, resistor 41, diode 42, point 7, the collector-emitter path of transistor 5, resistor 6, and source $E_1$. Thus it may be seen that the current flow now established through load 5 is in an opposite direction to the flow of current when input signals were received from terminal 10. The time during which current is flowing through load 4 is directly proportional to the frequency of the pulse signals received at input terminal 20. Thus the flow of current through load 4 in the direction of terminal 25 to 23 is a measurement of the incremental rate of the input pulse signals at terminal 20. Capacitor 45 serves to charge and discharge pulse signals, thereby smoothing the circuit operation. The current flowing through load 4 is thus an algebraic sum of the number of incremental rate of pulse signals at terminal 10 and the rate of pulse signals at terminal 20. A D.-C. analog current signal is received through load 4 which is directly proportional to the difference between the incremental rate of signals at terminal 10 and the incremental rate of signals at terminal 20. Load 4 may comprise any suitable measuring means for measuring direct-current flow.

During the operation of the converter of FIG. 3 when input signals are received from terminal 10 or terminal 20, diodes 22, 24, 26, 27, 39 and 42 all operate to prevent any other current from flowing through load 4 other than the current described in the current path between $E_7$ and $E_1$, current flowing through transistor 9 when input signals are received from terminal 10, and current flowing through transistor 15 when input signals are received from terminal 20. For example, when input signals are received from terminal 10 and a current path is created between source $E_7$, transistor 9, diode 22, load 4, resistor 38, diode 39, and point 7, leakage current is prevented from flowing through diode 27 by reason of the positive back bias signal on the cathode of diode 27 presented by the conducting transistor 14. Diode 26 of course prevents any flow of current from terminal 25 to the collector of transistor 15. When input pulse signals cease from terminal 10, transistor 9 is cut off and transistor 8 conducts. Diode 22 now prevents any flow of current from terminal 23 to transistor 9, and diode 24 prevents any flow of current through conducting transistor 8 to terminal 23 of load 4. Diodes 39 and 42 prevent any flow of current other than through the collector of transistor 5 when received from terminals 23 and 25 of load 4. Thus it may be seen that the association of the silicon diodes described with the transistors of electronics switches 2 and 3 provides a circuit which is highly accurate measurement of the incremental rate between the pair of input signals being received through load 4.

Load 4 may comprise any type of measuring system such as, for example, a recorder for measuring the average D.-C. current flowing therein. D.-c. sources $E_1$, $E_2$, $E_3$, $E_4$, and $E_7$ are shown for illustration purposes only and may be of different polarities provided the associated transistor circuitry is compatible therewith. For example, electronic switch 2 may have transistors of the NPN type and transistor 5 may be of the PNP type with the resulting D.-C. operating potentials adjusted accordingly by means well known in the art to provide operating potentials. It is essential that the diodes associated with the transistors be connected as shown in order to prevent undesirable leakage current from flowing through load 4.

The circuit shown in FIG. 2 is particularly adapted to a system wherein output signals are received from a digital computer which are indicative of a position error of an airplane. For example, in FIG. 2 input terminal 10 is responsive to the output of a digital computer for position error signals in one direction and input terminal 20 is responsive to the output of a digital computer for position error signals in the other direction.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Frequency determining means comprising a constant current generator, switch means connected to be responsive to first and second pulse trains respectively indicative of an incremental rate, measuring means, gate means responsive to said switch means for alternatively connecting said current generator to said measuring means to cause current flow through said measuring means in one direction or the direction opposite said one direction and to cause the output of said measuring means to be an indication of the algebraic sum of the frequency of said first and second pulse rates.

2. Frequency determining means comprising means for generating constant current, first and second input terminals connected to receive first and second pulse trains respectively, load means, first electronic switch means connected to said first input terminal for connecting said constant current generating means across said load means to cause current flow through said load in one direction, and second electronic switch means connected to said second input terminal for connecting said constant current generating means across said load means to cause current flow through said load in a direction opposite said one direction.

3. Frequency determining means comprising means for generating constant current, load means, first switch means for connecting said constant current generating means across said load means to cause current to flow through said load means in a first direction, second switch means for connecting said constant current means across said load means to cause current to flow through said load means in a second direction, said first and second switch means being operatively responsive to a pair of pulse trains.

4. Frequency determining means comprising constant direct current generating means having first and second output terminals, current measuring means having first and second input terminals, first switch means operatively responsive to a first pulse train for coupling said generating means first terminal to said first input terminal and said generating means second terminal to said second input terminal to provide current flow through said measuring means in one direction, second switch means operatively responsive to a second pulse train for coupling said generating means first terminal to said second input terminal and said generating means second terminal to said first input terminal to provide current flow through said measuring means in a direction opposite said one direction.

5. The combination recited in claim 4 wherein said first and second switch means each comprise a pair of transistors operatively coupled to form a monostable switch coupled to assume its unstable state in the presence of said pulse trains, one of said transistors being connected to couple said constant current generating means to said measuring means when said switch is in its unstable state.

6. In combination, means for generating a constant current, means for measuring current, a pair of input terminals, each of said terminals being connected to receive a separate pulse train, first means connected to one of said input terminals for providing a first current path between said constant current generating means and said current measuring means in response to one of said pulse trains, to drive current through said measuring means in a first direction, second means connected to the other of said input terminals for providing a second current path between said constant current generating means and said current measuring means in response to a second of said pulse trains to drive current through said measuring means in a second direction.

7. The combination recited in claim 6 wherein is included means for preventing flow in said first current path when current is flowing in said second current path.

8. The device as recited in claim 7 wherein said means for preventing flow in said first current path when current is flowing in said second current path comprises a plurality of diodes connected in said current paths.

9. In combination, a constant current generator, a load, first and second gates, a first electrical path from one side of said generator to one side of one of said gates, a second electrical path from said one side of said generator to one side of the other of said gates, each of the other sides of said gates being connected to an opposite side of said load, and first and second switch means for controlling said first and second gates respectively, said first and second switch means each providing a separate electrical path between a separate side of said load and the other side of said current generator.

10. An incremental rate converter for converting a first and second train of pulses indicative of positive and negative signals respectively to a D.C. signal indicative of the algebraic sum of said pulse signals comprising a constant current generator, a load, first switch means responsive to said first train of pulses for connecting said current generator across said load to cause current flow through said load in one direction, and second switch means for connecting said current generator across said load to cause current flow through said load in a direction opposite said one direction, to cause a D.-C. signal in accordance with the algebraic sum of the rates of said positive and negative pulse signals to be produced across said load.

11. In combination: a constant current source; an electrical load; a first monostable multivibrator adapted to channel the current from said current source through said load in a first direction when said first multivibrator is in its unstable state; a second monostable multivibrator adapted to channel the current from said current source in a second direction through said load when said second multivibrator is in an unstable state; each of said multivibrators having input terminals connected to cause said multivibrators to assume an unstable state when a signal is applied thereto.

12. In combination: a transistor current source; an electrical load; two current paths, each connected to cause current to flow from such transistor through said load in different directions; at least one diode in each of said current paths, said diodes being back biased to prevent conduction; a pair of current return paths connected to said load, including diode means connected in series therewith and normally back biased; and monostable multivibrator means connected to said current paths to cause currents selectively to be passed in one direction or the other through said load.

13. In combination: a first N-P-N transistor; a first and second diode, each connected by their cathode to the collector of said transistor; an electrical load, conductively connected at opposite terminals to the anodes of said diodes; first and second monostable multivibrators, connected to back-bias said diodes, respectively, when said multivibrators are in their stable state and to remove said bias when said multivibrators are in their unstable state; and means connected to said multivibrators to cause them to assume their unstable state in response to an input signal.

References Cited by the Examiner

UNITED STATES PATENTS

| | | | |
|---|---|---|---|
| 2,817,775 | 12/57 | Rosenberg et al. | 235—154 |
| 2,923,929 | 2/60 | Hesse | 235—197 |
| 2,963,698 | 12/60 | Slocomb | 235—154 |

OTHER REFERENCES

Page 782, 1955 edition, Electronic and Radio Engineering, by Terman.

MALCOLM A. MORRISON, *Primary Examiner.*

WALTER W. BURNS, JR., ABRAHAM BERLIN,
*Examiners.*